(12) United States Patent
Thielman et al.

(10) Patent No.: US 7,450,086 B2
(45) Date of Patent: Nov. 11, 2008

(54) PROJECTOR

(75) Inventors: Jeffrey Thielman, Corvallis, OR (US); Michael M. Blythe, Albany, OR (US); Dan Pinard, Corvallis, OR (US); Wyatt A. Huddleston, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 648 days.

(21) Appl. No.: 11/079,970

(22) Filed: Mar. 14, 2005

(65) Prior Publication Data

US 2006/0203208 A1   Sep. 14, 2006

(51) Int. Cl.
*G09G 3/00*   (2006.01)
(52) U.S. Cl. ............................................. 345/32; 345/84
(58) Field of Classification Search ................... 345/1.1, 345/1.2, 6, 7, 8, 173, 30–39, 84; 359/292; 353/74, 99, 31, 94, 102; 348/771; 349/8
See application file for complete search history.

(56) References Cited

U.S. PATENT DOCUMENTS

| | | | |
|---|---|---|---|
| 6,320,610 | B1 | 11/2001 | Van Sant et al. |
| 6,728,582 | B1 | 4/2004 | Wallack |
| 6,803,906 | B1 | 10/2004 | Morrison et al. |
| 2001/0017688 | A1* | 8/2001 | Inoue et al. .................... 353/74 |
| 2003/0218794 | A1* | 11/2003 | Takeda et al. ................ 359/292 |
| 2006/0001650 | A1* | 1/2006 | Robbins et al. ............. 345/173 |
| 2006/0007170 | A1* | 1/2006 | Wilson et al. ................ 345/173 |
| 2006/0109199 | A1* | 5/2006 | Yee et al. ...................... 345/1.3 |

* cited by examiner

*Primary Examiner*—Nitin Patel

(57) ABSTRACT

An embodiment of an apparatus includes a surface and a projector to project light onto the surface. The embodiment further includes a first lens array to receive the light from a first region of the surface and a second lens array to receive the light from a second region of the surface.

32 Claims, 1 Drawing Sheet

PROJECTOR

BACKGROUND

Interactive electronic projection systems allow human users to use the projection surface as a mechanism both for viewing content, such as computer graphics, video, and the like, as well as for the input of information into the system. Examples of interactive display surfaces include common touch-screens, such as bank automatic teller machines. However, such systems may limit input to particular regions of the projection surface.

DETAILED DESCRIPTION

Figure 1:
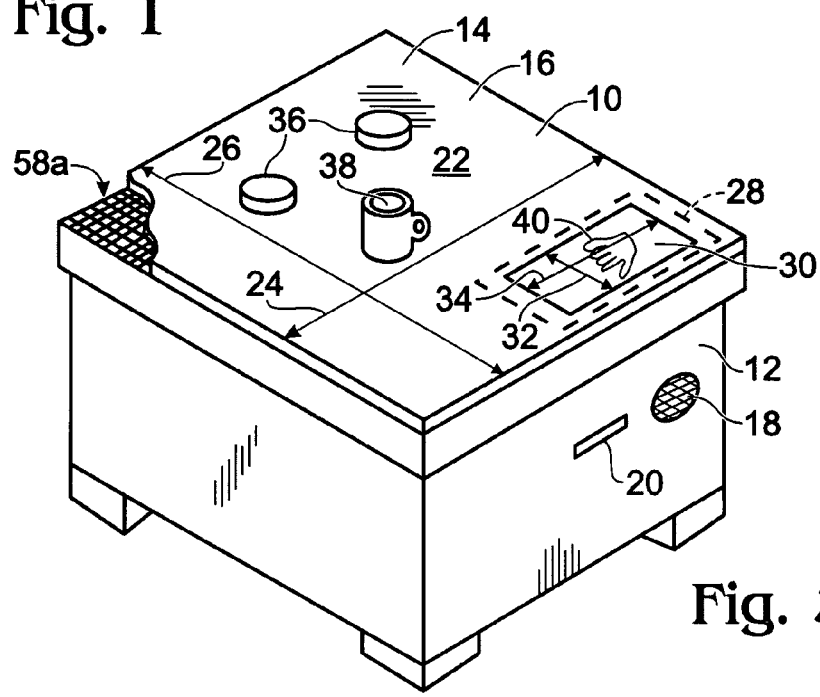
FIG. 1 shows a perspective view of one embodiment of an interactive projection system.

FIG. 1 shows a perspective view of one embodiment of a projection system, such as an interactive projection system 10. In the particular embodiment shown system 10 may be a "social computer," i.e., a computer that may be viewed by, and receive input from, multiple operators (not shown) simultaneously. System 10 may include a table 12 which may be sized to be used as an in-home coffee table or as an office conference room table, for example. A top surface 14 of table 12 may define a substantially horizontal plane and may function as a display surface 16. Top surface 14 may be manufactured of glass or any other suitable material. Due to the relatively large size and horizontal orientation of display surface 16, the surface may be viewed by multiple users sitting or standing around table 10. In the embodiment shown, display surface 16 may be a touch sensitive screen and may allow input thereto by the multiple users sitting around the table. Table 12 may further include one or more speaker/microphone systems 18 and one or more input devices 20, such as a floppy disk drive, a compact disk drive or the like. Accordingly, system 10 may receive input via display surface 16, microphone 18 and/or disk drive 20.

In one embodiment, such as the coffee table sized system shown, display surface 16 may define a surface area 22 having a width 24 of approximately twenty four inches or more and a length 26 of approximately thirty six inches or more. In other embodiments any suitably sized table may be utilized. A portion of surface area 22 may define a scanning region 28 wherein an object, such as document 30, may be placed face down on display surface 16 for scanning of the document 30 by optics positioned within table 12, as will be discussed in more detail below. Scanning region 28 may define less than half of surface area 22, and in the embodiment shown, may define an area having a width 32 of approximately nine inches and a length 34 of approximately twelve inches. The magnification of the optics positioned to image scanning region 28 may be greater than the magnification of the optics positioned to image the entirety of surface area 22. Accordingly, tokens 36 or a coffee cup 38 placed on display surface 16 may be imaged at a first magnification, and an object, such as a document 30 or a hand 40, placed within scanning region 28, may be imaged at a higher magnification. Tokens 36 may be three-dimensional objects that may interact or communicate with the computer system, such as with controller 50, of table 12.

Figure 2:
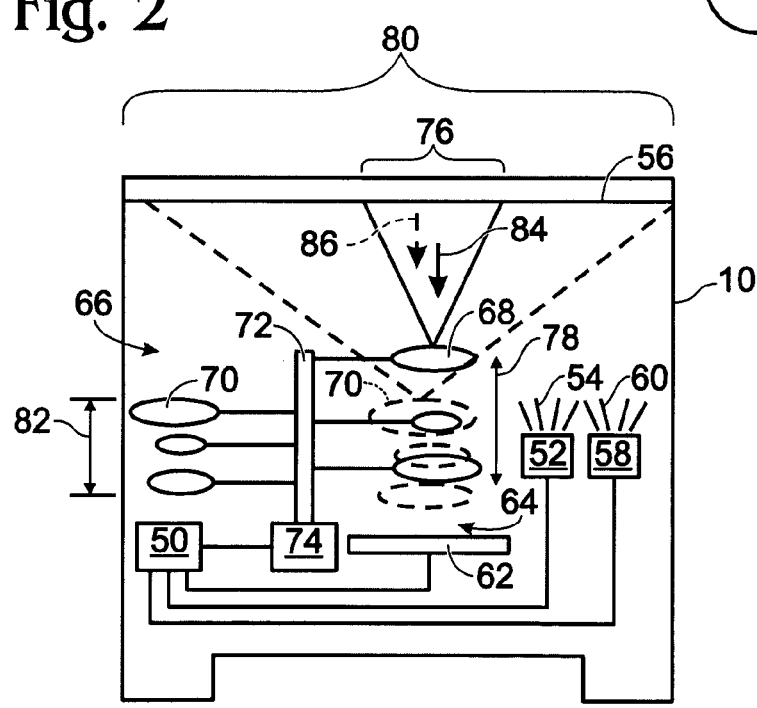
FIG. 2 is a schematic side view of one embodiment of an optics system positioned on a rotating shaft within the interactive projection system of FIG. 1.

FIG. 2 is a schematic side view of one embodiment of an optics system positioned on a rotating shaft within projection system 10. System 10 may include a controller 50 that may control an embodiment of a projector, such as light source 52, for projecting light 54 onto a lower surface 56 of display surface 16 for imaging of display surface 16, and another embodiment of a projector, such as an image projection device 58. Image projection device 58 may be a digital light processor (DLP) or projector, configured to display an image, such as optical light image 60, generated by the digital light projector (DLP) in response to digital signals from controller 50, onto display surface 16. In general, the controller 50 may generate electrical image signals indicative of viewable images, such as computer graphics, movie video, video games, Internet Web pages, and the like, which may be provided to image projection device 58. Controller 50 can take several forms, such as a personal computer, microprocessor, or other electronic devices capable of providing image signals to image projection device 58, and may be positioned internal or of external to table 12. Image projection device 58, in response to the electrical signals, may generate digital optical (viewable) images on the display surface 16. Controller 50 may receive data and other information to generate the image signals from various sources, such as hard drives, CD or DVD ROMs, computer servers, local and/or wide area networks, and the Internet, for example. Controller 50 may also provide additional output in the form of audio from speaker 18.

Image Projection device 58 may take a variety of forms. In general, the projector may generate a viewable digital image on display surface 16 by projecting a plurality of pixels of light 60 onto display surface 16. Each viewable image may be generated from millions of pixels 58a (see FIG. 1), that may, in one embodiment, correspond to an array of micro-mirrors, that may be positioned below display surface 16. Each pixel 58a may be individually controlled by the image projection device 58 to have a certain color and/or color intensity (both of which may be referred to as grey-scale). The combination of many light pixels of different colors and/or color intensities on the display surface 16 may generate a viewable image or "frame." Continuous video and graphics may be generated by sequentially combining frames together, as in a motion picture.

In particular, one embodiment of image projection device 58 may include a digital micro-mirror device (DMD) to project the light pixels 60 onto display surface 16. Other embodiments could include diffractive light devices (DLD), liquid crystal on silicon devices (LCOS), for example. Other spatial light modulator and display technologies are available and could be substituted Light image 60 may be visible on top surface 14 of table 12 to the multiple users of the system. The system may further include an image reading device 62 that may define a single image reading position 64 there above, and an optics system 66. For example, image reading device 62 may be a photo receptor such as a photocell, a photo diode, a CMOS image sensor, or a charge coupled device (CCD). Reading device 62 may be configured for specific spectrums of light, such as infrared, ultraviolet, visible, a sub-set thereof, or the like. Optics system 66 may include a first lens set 68 and a second lens set 70 both mounted on a rotating shaft 72, wherein the shaft may be rotated by a motor 74. Rotation of shaft 72 may place either first lens set 68 or second lens set 70 in image reading position 64 for receiving light, such as light including image data, by image reading device 62. In one embodiment, rotating a lens set into reading position 64, capturing an image, and rotating the lens set back out of reading position 64, so as to position the other lens set in reading position 64, may take less than a second, thereby providing a short time period in which an operator may wait to acquire an image.

First lens set 68 is shown in image reading position 64. The first lens set 68 may define a telephoto lens set that may image a first imaging region 76 of display surface 16. First imaging region 76 may be a portion of display surface 16, such as half or less than half, or approximately one third, of surface area 22 of display surface 16. In the embodiment shown, first imaging region 76 may define scanning region 28 for scanning of a letter sized document 30 placed on scanning region 28. First lens set 68 may define a magnification approximately three times greater or more than the magnification of second lens set 70 and may define a focal length 78 at least two times greater, and approximately three times greater, than a focal length of second lens set 70.

Second lens set 70 is shown in solid lines out of image reading position 64. However, second lens set 70 is also shown in dash lines, rotated into image reading position 64. In an embodiment, second lens set 70 may define a wide angle lens set that may image a second imaging region 80 of display surface 16. Second imaging region 80 may include an entirety of display surface 16, or at least more than half of surface area 22 of display surface 16. In the embodiment shown, second imaging region 80 may define an entirety of display surface 16 such that tokens 36, cup 38 and document 30 would all be imaged by second lens set 70 on image reading device 62. Second lens set 70 may define a magnification approximately three times less than the magnification of first lens set 68 and may define a focal length 82 approximately three times less than the focal length 78 of first lens set 68. Controller 50 may be operatively connected to image reading device 62 such that an image captured by device 62 may be provided to controller 50.

In the embodiment shown, image reading device 62 may image tokens 36 and forward this information to controller 50. Controller 50 may analyze the image and location of tokens 36 such that their identity and location may be responded to, such as in an interactive board game. Controller 50 may also receive touch-screen input instructions from display surface 16, such as when a user may desire to scan a printed document. In response, the controller 50 may provide instructions to motor 74 to move the close-up lens array 68 into single image reading position 64, based on the received touch-screen input instructions.

In one example embodiment, first lens set 68 may have a focal length of 4 mm, and second lens set 70 may have a focal length of 12 mm. In another example embodiment, first lens set 68 may have a magnification of 1×, and second lens set 70 may have a magnification of 3×. In another embodiment utilizing two cameras, such as one camera for each of two lens sets, one camera may have a resolution of one mega pixels and another camera may have a resolution of five mega pixels. Accordingly, image projection device 58 may produce a first light image 60 on display surface 16, first lens set 68 may receive a second light image 84 from first region 76 of display surface 16, and second lens set 70 may receive a third light image 86 from second region 80 of display surface 16, wherein the first, second and third images 60, 84 and 86 each are different from one another.

Providing one lens set with a greater magnification than the other lens set may allow scanning of a printed document at a sufficient resolution without utilizing a higher resolution imaging chip, which may reduce the cost of the system. Moreover, further cost reduction may be achieved because the focus of the scanning lens set may be fixed at the display surface, thereby reducing the complexity of or, in some embodiments, eliminating a focusing mechanism for the particular lens set.

In another embodiment, neither first lens set 68 nor second lens set 70 may be mounted on a rotating shaft but may each be fixedly positioned within table 12. Such a system may include a camera for each lens set, and a reading device 62 that corresponds to each lens set such that full view imaging and scan or zoom view imaging may each take place at the same time. In yet another embodiment, one lens set and a corresponding reading device 62 may be fixedly secured with table 12. The other lens set, along with its own corresponding reading device 62, may be mounted on a rotating shaft 72 such that a scanning or zoom view image may be taken at various locations of display surface 16 by rotating of shaft 72. Other movement mechanisms, such as tracks, conveyor belts, or spatial light modulation mechanisms, which may be referred to as "wobulation mechanisms," may be utilized to move one or both of the lens sets and/or image reading devices within table 12 to image any particular region of display surface 16.

Figure 3:
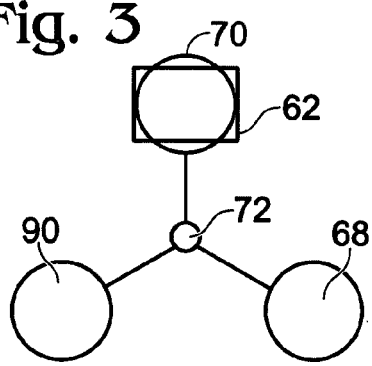
FIG. 3 is a schematic top view of another embodiment of a multi-lens array positioned on a rotating shaft.

FIG. 3 is a schematic top view of another embodiment of a multi-lens set optical system positioned on rotating shaft 72. In this embodiment, three lens sets, 68, 70 and 90 are positioned on rotating shaft 72. The third lens set 90 may comprise a lens set having a focal length and magnification different from first lens set 68 and second lens set 70. In other embodiments, any number of lens sets may be mounted on rotating shaft 72, wherein shaft 72 may be rotated to align any of the lens sets in single image reading position 64 (see FIG. 2). Lens set 70 is shown in image reading position 64 such that the lens set is positioned over image reading device 62. Lens sets 68, 70 and 90 may each comprise any suitable available lens set, such as a wide angle lens set, a telephoto lens set, or the like. Moreover, the individual lens sets may each include filters or other devices to provide a particular image to image reading device 62.

Referring again to FIG. 2, light 54 projected by light source 52 may be utilized for illuminating objects, such as tokens 36, mug 38, or hand 40, positioned on display surface 16 so that the objects may be viewed by optics system 66. In one embodiment, light source 52 may provide one spectrum range of light 54, or a variety of spectrum ranges of light 54 in sequence, such as any of the spectrum ranges of light from a color wheel, namely, red, green, blue, white and/or black, or light not readily visible to the unaided human eye, such as ultra violet light and/or infrared light. One or more of these spectrum ranges of light 54 may be projected by light source 52 onto display surface 16 and onto any object positioned thereon. Projection of one or more of these types of light 54 onto surface 16 may allow a spectral reflection of light from the object which may be detected by image reading device 62.

In the example of a person's hand 40, or a finger thereof, placed on display surface 16, the hand will provide a captured image unique to the particular person's hand. This captured image information may be matched to previously stored information within controller 50 to provide a secure login sequence, without the use of a typed password input from the operator. A particular spectral reflection of light from the hand or finger may provide additional individualized information from the hand that may also be matched to information previously stored within controller 50 so as to provide an enhanced secure login sequence or in other embodiments the particular spectral reflection associated with an individual may be used by itself as a basis to allow access. The additional information provided by illuminating hand 40, or a finger thereof, with a particular spectrum range of light may be individualized in that each individual's hand may reflect a particular spectrum of light differently than another individual's hand, due to, for example, palm color, skin condition, water content, moles or freckles, scars, and other factors. In other words, a first operator's hand may provide a different, or even very different, captured image spectral reflection in red light than a second operator's hand in red light. Accordingly, during a login sequence, an operator's hand may be illuminated sequentially with several different spectral ranges of light 54. The captured image reflection of the hand during each range of spectral light illumination may then be matched with spectral reflection images previously stored in memory within controller 50 to provide a variety of "handprints" unique to the particular operator. This increased number of "handprints" for each operator may increase the certainty that a particular operator attempting to logon is indeed the same operator for which spectral reflections were previously stored in the memory of controller 50. This secure login procedure may be particularly useful, for example, when projection system 10 is utilized for financial transactions or other such confidential matters.

The multiple spectral reflection sequence may be conducted during a short time period, such as less than one second, to provide increased security benefits to system 10. Moreover, the projection system may determine the particular surface area on display surface 16 covered by hand 40 and may illuminate that particular region with one or more of the spectrum ranges of light 54, without substantially illuminating other regions with the one or more of the spectrum ranges of light 54, such that other regions of display 16 may continue to show a previously displayed image without interruption. In one embodiment, the spectrum range of light may be projected to display surface 16 and may be captured from first imaging region 76 by a telephoto lens set, such as lens set 68.

Other variations and modifications of the concepts described herein may be utilized and fall within the scope of the claims below.

What is claimed is:

1. An apparatus, comprising:
   a surface;
   a projector to project light onto said surface;
   a first lens array to receive the light from a first region of said surface;
   a second lens array to receive the light from a second region of said surface; and
   an imaging device to receive image data from a selected one of the first and second lens arrays depending on which of the first and second lens arrays has been moved to a predetermined position.

2. The apparatus of claim 1 wherein said surface is a projection surface.

3. The apparatus of claim 1 wherein said projector is a light processor.

4. The apparatus of claim 1 wherein said first region is different from said second region.

5. The apparatus of claim 1 wherein said first and second lens arrays are mounted on a rotating shaft to move the selected one of the first and second lens arrays to the predetermined position.

6. The apparatus of claim 1 wherein said first region comprises a portion of said surface and wherein said second region comprises an entirety of said surface.

7. The apparatus of claim 1 wherein the imaging device is a charged coupled device.

8. The apparatus of claim 1 wherein the imaging device is a CMOS image sensor.

9. The apparatus of claim 1 wherein said first lens array defines a first focal length and said second lens array defines a second focal length different from said first focal length.

10. The apparatus of claim 9 wherein said first focal length is at least three times greater than said second focal length.

11. The apparatus of claim 1 wherein said projector and said first and second lens arrays are each positioned below said surface, and wherein said surface is configured to be viewed from above by multiple users.

12. The apparatus of claim 1 wherein said projector comprises a digital light processor.

13. The apparatus of claim 1 wherein said surface comprises a table top.

14. The apparatus of claim 1 further comprising a light source positioned to direct light onto said surface, said light of the light source comprising a spectrum range of light.

15. The apparatus of claim 14 wherein said spectrum range of light is chosen from one of red light, green light, blue light, white light, black light, ultra violet light, and infrared light.

16. An apparatus, comprising:
    a surface;
    a projector to project light onto said surface;
    a first lens array to receive the light from a first region of said surface;
    a second lens array to receive the light from a second region of said surface;
    a light source positioned to direct light onto said surface, said light comprising a spectrum range of light; and
    a controller, wherein said spectrum range of light is reflected from an object positioned on said surface to provide a captured spectrum range image of said object, and wherein said captured spectrum range image is compared to a stored spectrum range image of said object stored within said controller to provide a secure login sequence.

17. A computer system, comprising:
    a display surface;
    a light processor that projects an image onto said display surface;
    a first lens array adapted to receive light from said display surface, wherein said first lens array defines a first focal length; and
    a second lens array adapted to receive light from said display surface, wherein said second lens array defines a second focal length different from said first focal length,
    wherein said first lens array receives light including image data from a first region of said display surface, said second lens array receives light including image data from a second region of said display surface.

18. The system of claim 17, wherein said first region comprises substantially one third of said display surface and said second region comprises substantially an entirety of said display surface.

19. The system of claim 17 wherein said first lens array defines a magnification sufficient to project to an imaging device light including an image of a letter sized, printed document.

20. The system of claim 17 wherein said second lens array defines a magnification sufficient to project to an imaging device light including an image of an object positioned on said display surface.

21. The system of claim 17 further comprising an image data receiving device that defines a single image data receiving position, wherein said first and second lens arrays are each selectively movable into said single image data receiving position, the image data receiving device to receive image data from a selected one of the first and second lens arrays that has been moved to the signal image data receiving position.

22. The system of claim 17 further comprising a illumination source that illuminates an underside of said display surface with a portion of the light spectrum.

23. The system of claim 17 wherein said illumination source illuminates an underside of said display surface with a sequence of different portions of the light spectrum.

24. The system of claim 17 wherein said first lens array comprises a telephoto lens array and said second lens array comprises a wide-angle lens array.

25. A computer, comprising:
   a display surface configured to facilitate viewing of said display surface by multiple users;
   a light processor that projects an image onto said display surface;
   a close-up lens array adapted to receive light including data from a portion of said display surface; and
   a wide angle lens array adapted to receive the light from a complete region of said display surface.

26. The computer of claim 25 wherein said display surface defines a horizontal table top.

27. The computer of claim 25 wherein said close-up lens array and said wide-angle lens array are positioned on a rotating shaft, said shaft adapted to rotate so as to position one of said close-up lens array and said wide-angle lens array in an image receiving position.

28. The computer of claim 25 wherein said first and second lens arrays and said light processor are each positioned below said display surface.

29. The computer of claim 25 further comprising a controller adapted to receive touch-screen input instructions from said display surface, said controller adapted to move one of said close-up lens array and said wide-angle lens array into a single image receiving position, based on said received touch-screen input instructions.

30. A method, comprising:
   moving a support to position one of a first optical system and a second optical system of a display system into a viewing position relative to a display surface based on an instruction received by the display system;
   receiving light through one of said first optical system and said second optical system positioned within said viewing positions;
   receiving, at an imaging device, image data from a first region of the display surface when the first optical system is positioned within said viewing position; and
   receiving, at the imaging device, image data from a second region of the display surface when the second optical system is positioned within said viewing position.

31. The method of claim 30 further comprising projecting said light to a charge coupled device.

32. The method of claim 30 wherein said light comprises receiving a reflected light image comprised of light from a portion of the light spectrum.

* * * * *

UNITED STATES PATENT AND TRADEMARK OFFICE
CERTIFICATE OF CORRECTION

PATENT NO. : 7,450,086 B2 Page 1 of 1
APPLICATION NO. : 11/079970
DATED : November 11, 2008
INVENTOR(S) : Jeffrey Thielman et al.

It is certified that error appears in the above-identified patent and that said Letters Patent is hereby corrected as shown below:

Title Pg, Item (75), "Inventors", delete "Philomath, OR (US)" and insert -- Allen, TX (US) --, therefor.

In column 8, line 17, in Claim 30, delete "positions;" and insert -- position; --, therefor.

Signed and Sealed this

Twenty-fourth Day of March, 2009

JOHN DOLL
*Acting Director of the United States Patent and Trademark Office*